United States Patent
Tanabe et al.

(10) Patent No.: US 11,454,058 B2
(45) Date of Patent: Sep. 27, 2022

(54) VEHICLE DOOR SWITCH AND METHOD FOR ATTACHING VEHICLE DOOR SWITCH

(71) Applicant: NABTESCO CORPORATION, Tokyo (JP)

(72) Inventors: Kazuo Tanabe, Tokyo (JP); Ikuo Makihira, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 409 days.

(21) Appl. No.: 16/686,445

(22) Filed: Nov. 18, 2019

(65) Prior Publication Data
US 2020/0208454 A1 Jul. 2, 2020

(30) Foreign Application Priority Data
Dec. 26, 2018 (JP) .............................. JP2018-242319

(51) Int. Cl.
*E05F 15/40* (2015.01)
*G01D 5/14* (2006.01)
*B61D 19/02* (2006.01)

(52) U.S. Cl.
CPC .............. *E05F 15/40* (2015.01); *B61D 19/02* (2013.01); *G01D 5/14* (2013.01); *E05Y 2400/445* (2013.01); *E05Y 2900/51* (2013.01)

(58) Field of Classification Search
CPC ....................................................... G01D 5/14
See application file for complete search history.

(56) References Cited

U.S. PATENT DOCUMENTS

| 4,926,332 A | * | 5/1990 | Komuro | G07C 9/00722 340/5.72 |
| 2019/0218848 A1 | * | 7/2019 | Fujita | E05F 15/659 |
| 2019/0242175 A1 | * | 8/2019 | Fujita | E05B 47/026 |

FOREIGN PATENT DOCUMENTS

| EP | 2447130 A1 | 5/2012 |
| JP | 9-301158 A | 11/1997 |

OTHER PUBLICATIONS

Extended European Search Report dated May 20, 2020 issued in corresponding European Patent Application No. 19210825.6.

\* cited by examiner

*Primary Examiner* — Walter L Lindsay, Jr.
*Assistant Examiner* — Milton Gonzalez
(74) *Attorney, Agent, or Firm* — Pillsbury Winthrop Shaw Pittman, LLP

(57) ABSTRACT

The present invention is to provide a vehicle door switch that is capable of adjusting the amount of movement made by a rod with ease and a method for attaching a vehicle door switch. A vehicle door switch includes a rod configured to move as a door is closed, a detecting unit configured to output a detection signal when one of ends of the rod has moved by a predetermined distance or more, and a limiting unit configured to limit the amount of movement made by the rod within a range where the detecting unit outputs the detection signal.

5 Claims, 12 Drawing Sheets

VEHICLE DOOR SWITCH AND METHOD FOR ATTACHING VEHICLE DOOR SWITCH

CROSS-REFERENCE TO RELATED APPLICATIONS

This application is based on and claims the benefit of priority from Japanese Patent Application Serial No. 2018-242319 (filed on Dec. 26, 2018).

TECHNICAL FIELD

The present invention relates to a vehicle door switch for detecting a door of a railway vehicle and a method of attaching a vehicle door switch.

BACKGROUND

A known vehicle door switch for a railway vehicle is disclosed in Japanese Patent Application Publication No. Hei 09-301158 ("the '158 Publication"). A vehicle door switch detects whether or not a door is fully closed. The vehicle door switch is in the ON state while the door is fully closed and brought into the OFF state when the door is opened.

The vehicle door switch detects that the door is fully closed immediately before the door actually gets fully closed. This means that, after the vehicle door switch detects that the door is fully closed, the door slightly moves in such a direction that the door is actually fully closed. Here, as for the distance between the position of the door at the timing when the vehicle door switch detects the fully closed state and the position of the door at the timing when the door stops moving as it is actually fully closed, the optimal value varies depending on the design specifications of the door. This distance is correlated with the amount of the movement to be made by the rod of the vehicle door switch. The amount of the movement to be made by the rod is designated for each type of vehicles. It, however, takes a lot of efforts to design and develop a plurality of types of vehicle door switches differing in terms of amount of the movement to be made by the rod. The present invention is to provide a vehicle door switch that is capable of adjusting the amount of the movement to be made by the rod with ease and a method for attaching a vehicle door switch.

SUMMARY (1) A vehicle door switch according to one aspect of the present disclosure includes a rod configured to move as a door is closed, a detecting unit configured to output a detection signal when one of ends of the rod has moved by a predetermined distance or more, and a limiting unit configured to limit an amount of movement made by the rod within a range where the detecting unit outputs the detection signal. With this arrangement, the amount of the movement to be made by the rod can be easily adjusted. In addition, when it is desired to detect an object that may be caught in the door, it can be easy to adjust the thickness of the object to be detected.

(2) By way of non-limiting examples, the limiting unit is configured as a spacer for limiting the amount of the movement to be made by the rod and attached to a housing that supports the rod in a movable manner. With this arrangement, the limiting unit can be prepared easily.

(3) By way of non-limiting examples, the limiting unit is provided on the rod as a protrusion for limiting the amount of the movement to be made by the rod. With this arrangement, it can be easy to adjust the amount of the movement to be made by the rod simply by replacing the rod or adding a part to the rod.

(4) By way of non-limiting examples, the limiting unit changes the position at which the detecting unit is positioned, relative to the housing on which the detecting unit is provided. With this arrangement, the amount of the movement to be made by the rod can be adjusted without the need of changing the contour of the vehicle door switch.

(5) A method for attaching a vehicle door switch according to another aspect of the present disclosure includes a method for attaching a vehicle door switch including a rod configured to move as a door is closed, a detecting unit configured to output a detection signal when one of ends of the rod has moved by a predetermined distance or more, and a limiting unit configured to limit an amount of movement made by the rod within a range where the detecting unit outputs the detection signal. The method includes attaching the vehicle door switch to a vehicle and subsequently adjusting a position of a pressing unit provided on the door, where the pressing unit is configured to press the rod. With this arrangement, the vehicle door switch can be installed in the same manner as an existing vehicle door switch.

ADVANTAGES

According to the vehicle door switch of the present disclosure, the amount of the movement to be made by the rod can be adjusted with ease. According to the method for attaching a vehicle door switch of the present disclosure, a door switch can be switched in an existing manner.

DESCRIPTION OF THE EMBODIMENTS

First Embodiment

Figure 1:
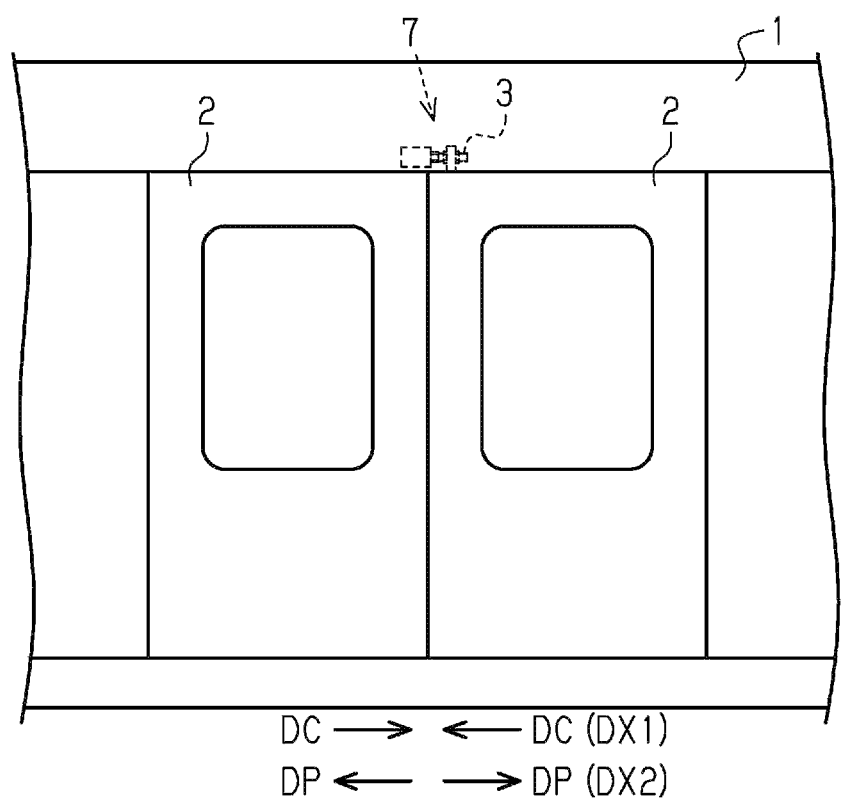
FIG. 1 schematically illustrates a door of a railway vehicle.

With reference to FIGS. 1 to 11, a vehicle door switch (hereinafter, may be referred to as "the door switch" in any of the embodiments) will be described.

A door switch 7 is provided around a door 2 for a railway vehicle. In the following description of the present embodiment, the door switch 7 is used for a double door 2. Note that the door switch 7 may be also applicable to a single swinging door.

The door 2 is moved along the front-rear direction of the vehicle using the power provided by a driving device (not shown). The phrase "a closing direction DC" denotes the direction in which the door 2 is moved when the door 2 is to be closed. The phrase "an opening direction DP" denotes the opposite direction to the closing direction DC. When the other parts than the door 2 are described, "a first direction DX1" denotes the same direction as the closing direction DC, and "a second direction DX2" denotes the same direction as the opening direction DP.

The door 2 is provided with a pressing unit 3 for pressing the door switch 7. The pressing unit 3 is arranged above the door 2. The pressing unit 3 is attached to the door 2 such that the position of the pressing unit 3 can be adjusted in the first direction DX1 and in the second direction DX2. The pressing unit 3 moves together with the door 2. The pressing unit 3 is attached to the door 2 in such a manner that the pressing unit 3 stays in contact with a rod 13 (will be described below) of the door switch 7 during a period of time from immediately before the door 2 is fully closed to when the door 2 is fully closed.

The door switch 7 detects whether or not the door 2 is fully closed. The door switch 7 is, for example, attached to a vehicle body 1 above the doorway. When the door 2 is in a position immediately before the fully closed state, the door switch 7 comes in contact with the pressing unit 3 of the door 2. When the pressing unit 3 of the door 2 comes into contact with the door switch 7, the door switch 7 accordingly switches the state of the electrical contact from the ON state to the OFF state, or from the OFF state to the ON state. In the present embodiment, the door switch 7 is switched from the OFF state to the ON state immediately before the door 2 is fully closed. Hereinafter, "the ON state" denotes an electrical state in which the electrical contact in the door switch 7 is in the ON state and "OFF state" denotes an electrical state in which the electrical contact is in the OFF state. The signal or information indicating whether the door switch 7 is in the ON/OFF state is used by a control unit of the vehicle or door control unit. For example, one of the necessary conditions to allow the vehicle to depart is that the door switch 7 is in "the ON state" (in other words, the fully closed state is detected) in all of the doors 2 of the vehicle. If a foreign object 50 is caught in any of the doors 2, the door switch 7 of the door 2 does not detect the fully closed state and thus does not enter "the ON state." This does not satisfy the necessary conditions to allow the vehicle to depart. In the above-described manner, the railway vehicle can be prevented from departing with the foreign object 50 being caught in the door 2 and the safety is thus assured.

Figure 2:
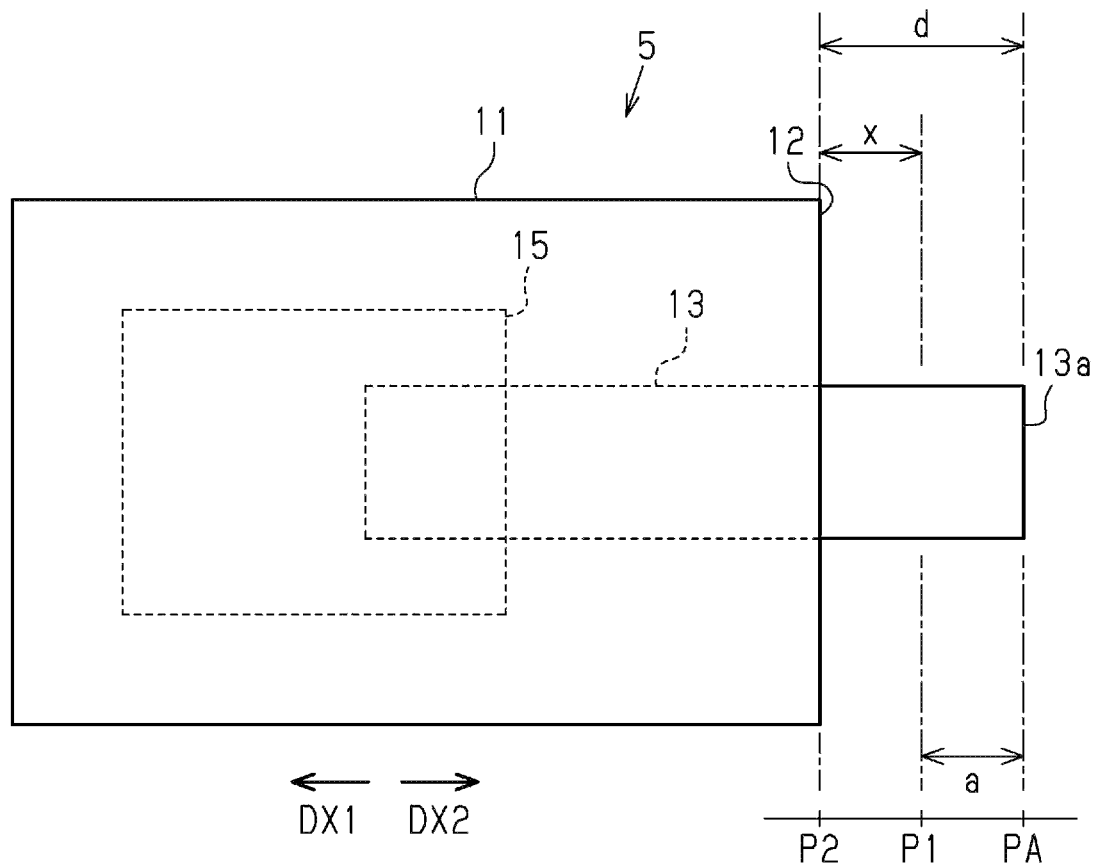
FIG. 2 schematically illustrates an existing door switch.

An existing door switch 5 is described with reference to FIGS. 2 to 5. As shown in FIG. 2, the door switch 5 includes a housing 11 provided on a vehicle body 1, a rod 13 and a detecting unit 15.

The housing 11 supports the rod 13 in a movable manner. The housing 11 houses therein a portion of the rod 13. The end portion of the rod 13 in the second direction DX2 is placed outside the housing 11. The housing 11 has a full-closure reference surface 12 on which the pressing unit 3 of the door 2 (will be described below) abuts when the door 2 is fully closed. More specifically, the full-closure reference surface 12 is at the end surface of the housing 11 through which the rod 13 protrudes outwardly. The full-closure reference surface 12 is positioned on the path along which the pressing unit 3 moves and oriented perpendicularly to the moving path. The housing 11 is attached to the vehicle body 1 in such a manner that the full-closure reference surface 12 is arranged as described below.

Figure 3:
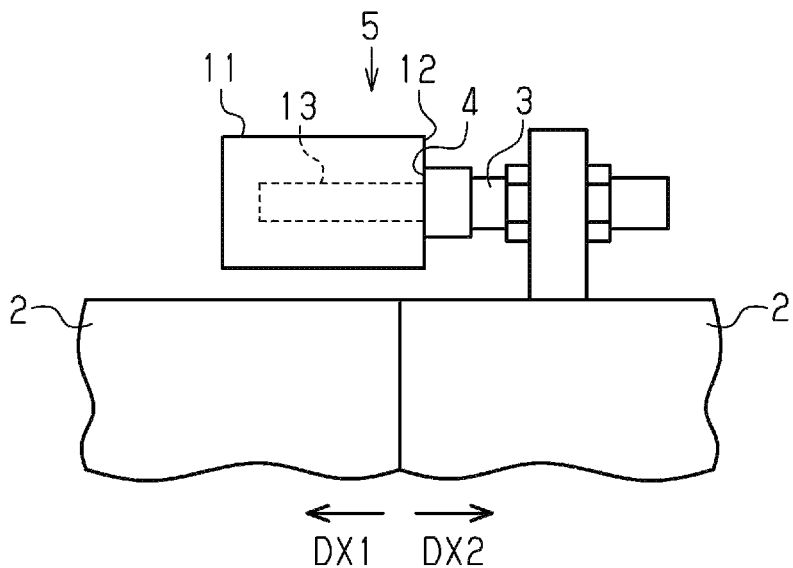
FIG. 3 schematically illustrates an existing door switch, in particular, what is observed around the door switch when a door is actually fully closed.

As shown in FIG. 3, the full-closure reference surface 12 is positioned in such a manner that, when the door 2 is actually fully closed, a pressing surface 4 of the pressing unit 3 comes into contact with the full-closure reference surface 12. In other words, the full-closure reference surface 12 is arranged at a position where the pressing surface 4 of the pressing unit 3 of the door 2 is arranged when the door 2 is actually fully closed.

The rod 13 is attached to the housing 11 such that it is movable in the same direction as the direction in which the pressing unit 3 moves. The central axis of the rod 13 extends along the path along which the pressing unit 3 moves. The rod 13 is biased in the second direction DX2. The rod 13 moves in the first direction DX1 when the pressing unit 3, which moves in the closing direction DC, comes into contact with the rod 13. When pressed by the pressing unit 3, the rod 13 moves from an initial position PA, through a first prescribed position P1, and to a second prescribed position P2. The initial position PA is where the rod 13 is positioned when the pressing unit 3 is not in contact with the rod 13. The first prescribed position P1 is where the rod 13 is positioned when the detecting unit 15 described below makes the detection, in a case where the rod 13 moves in the first direction DX1. The second prescribed position P2 is where the rod 13 is positioned when the pressing surface 4 of the pressing unit 3 is in contact with the full-closure reference surface 12 when the door 2 is fully closed.

The detecting unit 15 outputs a detection signal when one of the ends of the rod 13 has moved by a predetermined distance or more. The detecting unit 15 outputs the detection signal when the rod 13 has moved in the first direction DX1 and arrived at the first prescribed position P1. The detecting unit 15 keeps outputting the detection signal while the rod 13 further moves in the first direction DX1 after arriving at the first prescribed position P1 as a result of moving in the first direction DX1. The range where the detecting unit 15 outputs the detection signal is the range from when the rod 13 has moved in the first direction DX1 and arrived at the first prescribed position P1 to when the rod 13 has arrived and stopped moving at the second prescribed position P2. More specifically, the detecting unit 15 outputs the detection signal within the range where the rod 13 is moving from the first prescribed position P1 to the second prescribed position P2. A prescribed interval distance x from the first prescribed position P1 to the second prescribed position P2 is equivalent to the travel distance (the amount of the movement) over which the detecting unit 15 keeps outputting the detection signal. In the present embodiment, "to detect" means that the detecting unit 15 outputs the detection signal. For example, the detecting unit 15 is configured as a circuit including a mechanical switch (not shown). The detecting unit 15 switches the state of the electrical contact from the OFF state to the ON state based on the fact that the rod 13 has moved in the first direction DX1 and arrived at the first prescribed position P1.

In the above-described manner, the door switch 5 detects the door 2 is fully closed immediately before the door 2 is actually fully closed. The reason why the full-closure is detected immediately before the door 2 is actually fully closed is described in the following. If the first prescribed position P1 that causes the state of the door switch 5 to be switched from the OFF state to the ON state coincides with the second prescribed position P2 that indicates that the door 2 is actually fully closed, the following issue arises. The door switch 5 and the pressing unit 3 may be attached off the designated position. In this case, even if the door 2 is actually fully closed, the state of the door switch 5 may not be switched from the OFF state to the ON state and the door switch 5 may not detect the full closure and stay in a non-detection state. If the door switch 5 remains in the non-detection state, the condition to allow the vehicle to depart is never satisfied and the vehicle operation may be disadvantageously canceled. For the reasons stated above, the door switch 5 is configured to detect the fully-closed state when the door 2 is at a position that immediately precedes the position at which the door 2 is actually fully closed.

Figure 4:
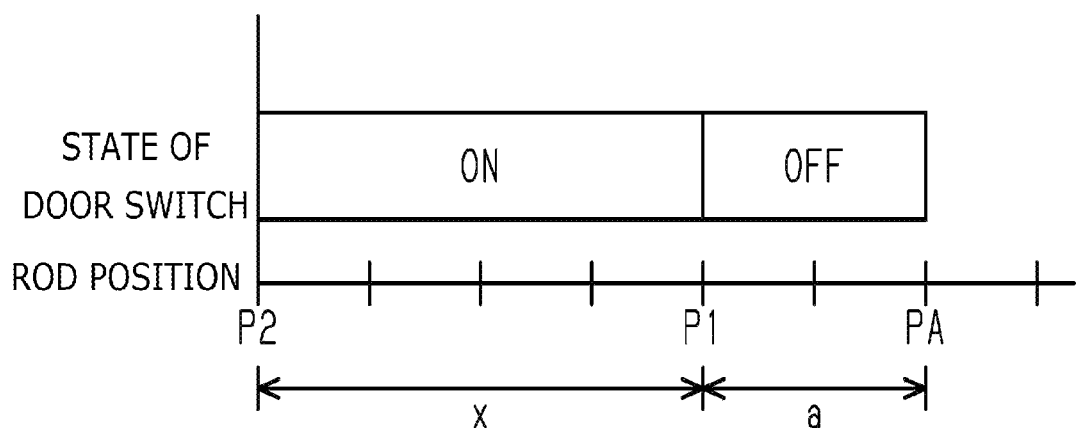
FIG. 4 illustrates how the position of a rod of an existing door switch is related to whether the door switch is in the ON or OFF state.

With reference to FIGS. 2 and 4, the distance between the first prescribed position P1 and the second prescribed position P2 (hereinafter, referred to as "the prescribed interval distance x") will be described in relation to the door switch 5. The letter "a" denotes the distance between the initial position PA and the first prescribed position P1. The value of "a" is larger than 0. The letter "d" denotes the distance between the initial position PA and the second prescribed position P2. Accordingly, the prescribed interval distance x can be expressed as "d-a."

Figure 5:
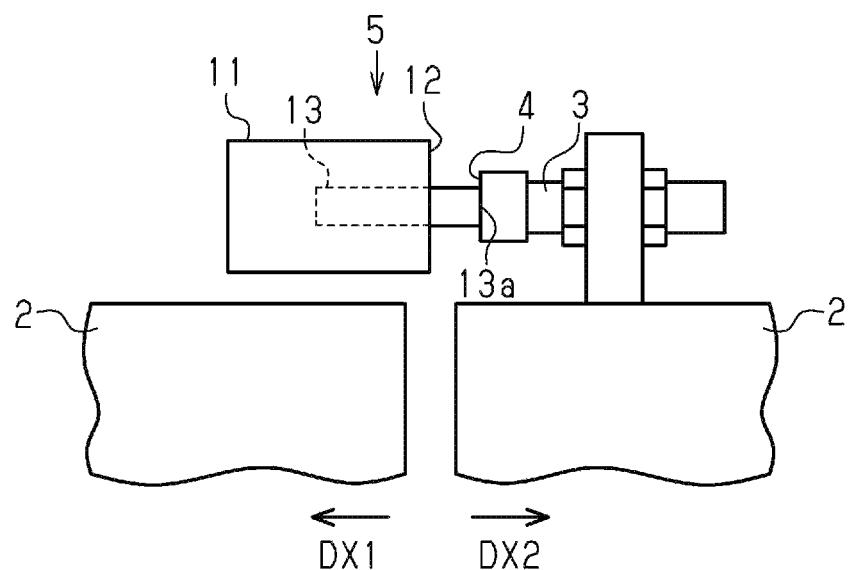
FIG. 5 schematically illustrates what is observed around an existing door switch immediately before the fully closed state is detected.
Figure 6:
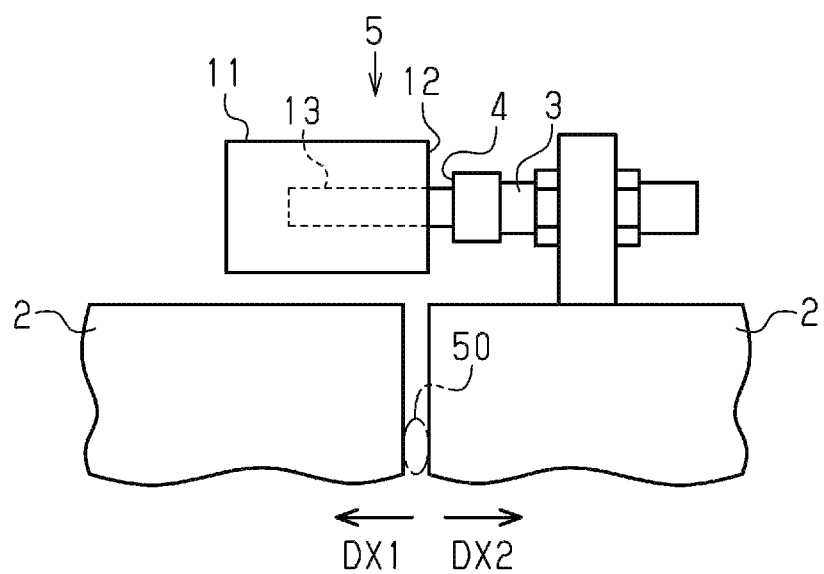
FIG. 6 schematically illustrates what is observed around an existing door switch when the fully closed state is detected.

With reference to FIGS. 5 and 6, the following describes how the door switch 5 operates when the door 2 is to be closed. As shown in FIG. 5, the door switch 5 is in the OFF state when the pressing surface 4 of the pressing unit 3 of the door 2 comes into contact with the end surface 13a of the rod 13. In other words, the door switch 5 has not detected the full-closure.

As shown in FIG. 6, as the door 2 moves, the rod 13 is pressed in the first direction DX1. When the rod 13 arrives at the first prescribed position P1, the door switch 5 enters the ON state. In other words, the door switch 5 detects the full-closure. At this point, there is a gap between the two door leaves of the door 2. Following this, the door switch 5 remains in the ON state until the door 2 moves in the closing direction DC and is fully closed.

Here, the existing door switch 5 has the following problems. In the following description, the expression "door closure detecting position" denotes the position of the door 2 that resultantly puts the rod 13 at the first prescribed position P1 and the expression "door fully-closed position" denotes the position of the door 2 that resultantly puts the rod 13 at the second prescribed position P2.

The existing door switch 5 remains in the ON state even when the door 2 stays stationary at any position between the door closure detecting position and the door fully-closed position. This means that, even when a foreign object 50 such as a rope is caught between the two door leaves of the door 2, the door switch 5 remains in the ON state and the vehicle is accordingly allowed to depart provided that the door 2 is positioned between the door closure detecting position and the door fully-closed position. This accident is attributable to the discrepancy between the first prescribed position P1 and the second prescribed position P2 of the rod 13. When the door 2 is a double door, the door switch 5 is in the ON state if the foreign object 50 caught between the door leaves of the door 2 has a thickness smaller than double the prescribed interval distance x. This is because the distance between the position of the rod 13 and the second prescribed position P2 is shorter than the prescribed interval distance x. In other words, in the above-described case, the door switch 5 does not detect that the foreign object 50 is caught. Thus, the prescribed interval distance x defines the thickness of the foreign object 50 that can be detected as the foreign object 50. Here, it is not appropriate that the first prescribed position P1 is designed to coincide with the second prescribed position P2 as described above.

For the reasons stated above, the prescribed interval distance x is set taking into consideration the variability in position where the door switch 5 is attached and the variability in position where the pressing unit 3 is attached and the thickness of the foreign substance 50 that is desired to be detected. The prescribed interval distance x is determined for each type of vehicles. The prescribed interval distance x differs in value between when the accuracy of the position where the door switch 5 is attached and the accuracy of the position where the pressing unit 3 is attached are high and when the accuracies are low. In addition, the prescribed interval distance x takes different values depending on the designated value of the thickness of the foreign object 50 that is desired to be detected. Accordingly, the door switch 5 is the one selected from a plurality of types of existing door switches 5 that is compatible with the vehicle, or the door switch 5 is manufactured such that it is compatible with the vehicle. Here, different vehicles require different types of door switches 5. This makes it complicated to manage the parts for the purpose of preparing the door switch 5. It also requires efforts and time to individually manufacture a plurality of door switches 5 such that they are compatible with different types of vehicles and various specifications. For the reasons stated above, it is now required to improve the door switch 5.

Figure 7:
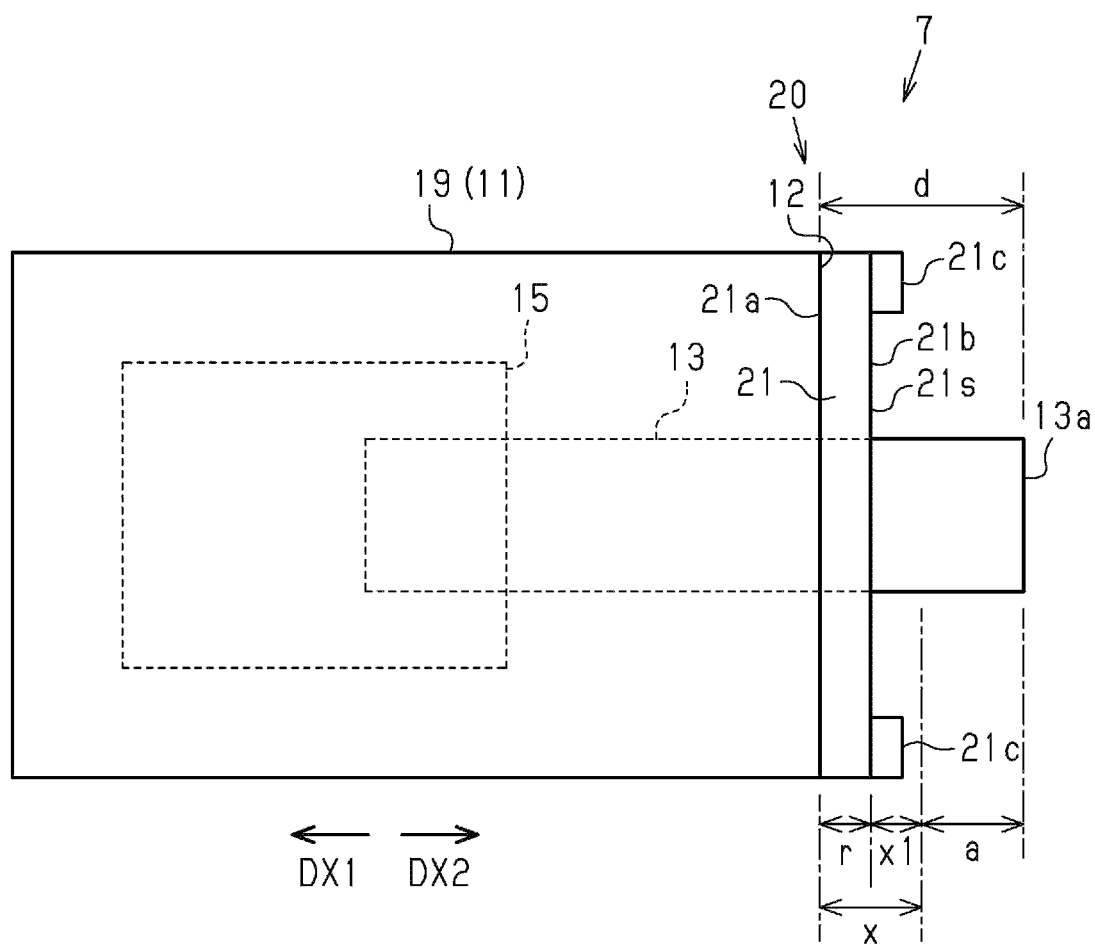
FIG. 7 schematically illustrates a door switch relating to a first embodiment.

With reference to FIG. 7, the door switch 7 relating to the present embodiment is described. The door switch 7 is based on the existing door switch 5. The door switches 5 and 7 have some common components. In the following description of the door switch 7, those components will be identified by the same reference numerals as used for the existing door switch 5.

According to the existing door switch 5, the rod 13 moves by the prescribed interval distance x, which is the distance between the first prescribed position P1 and the second prescribed position P2. As described above, when the rod 13 is positioned between the first prescribed position P1 and the second prescribed position P2, the detecting unit 15 outputs the detection signal.

The door switch 7 has a housing 19. The housing 19 supports the rod 13 in a movable manner. In addition, the door switch 7 relating to the present embodiment includes a limiting unit 20, described below, which is configured to limit the amount of the movement to be made by the rod 13 within the range where the detecting unit 15 can output the detection signal. Specifically speaking, the position of the full-closure reference surface 21s of the housing 19 can be changed along the direction in which the rod 13 moves. With this arrangement, the second prescribed position P2 of the rod 13 can be changed, and the prescribed interval distance x can be resultantly changed. The following more specifically describes the door switch 7.

The door switch 7 includes a housing 19, a rod 13 and a detecting unit 15. The door switch 7 further includes a limiting unit 20. The limiting unit 20 limits the amount of the movement to be made by the rod 13 within the range where the detecting unit 15 can output the detection signal. Here, "the range where the detecting unit 15 can output the detection signal" is, as defined above, the range where the rod 13 moves by the prescribed interval distance x1 from the first prescribed position P1 to the second prescribed position P2. In summary, in the door switch 7 relating to the present embodiment, the limiting unit 20 limits the length of the prescribed interval distance x1 (the amount of the movement to be made by the rod 13). Specifically speaking, the limiting unit 20 is a spacer 21 as will be described below. The limiting unit 20 is attached to the housing 19. The housing 19 may be the housing 11 of the existing door switch 5. The housing 19 (the housing 11 of the existing door switch 5), the rod 13 and the detecting unit 15 may constitute a component equivalent to the existing door switch 5

The limiting unit 20 has the full-closure reference surface 21s. For example, the limiting unit 20 is a plate-like spacer 21. The spacer 21 is attached to the end surface of the housing 19 in the second direction DX2. The spacer 21 is attached using a detachable fastening member 21c such as a bolt, for example. The spacer 21 has a first surface 21a and a second surface 21b on the opposite side to the first surface 21a. The first surface 21a is in contact with the end surface of the housing 19 in the second direction DX2 (the full-closure reference surface 12 of the existing door switch 5). The second surface 21b faces the second direction DX2 and constitutes the full-closure reference surface 21s. The thickness of the spacer 21 is designated for each type of vehicles. By changing the thickness of the spacer 21, the position of the full-closure reference surface 21s is changed.

Figure 8:
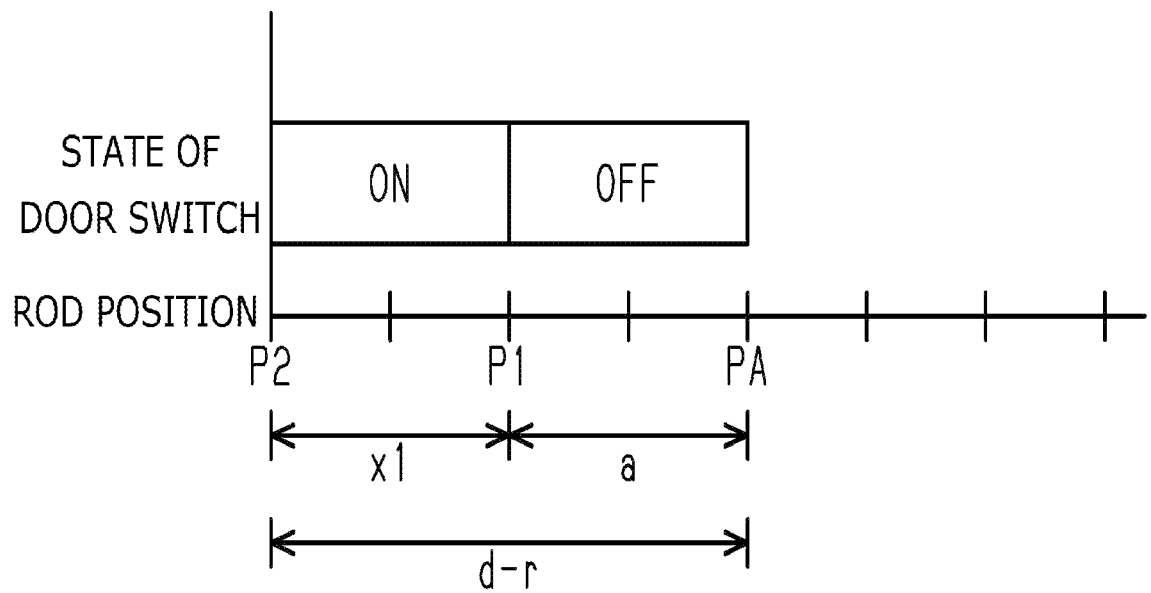
FIG. 8 illustrates how the position of a rod of the door switch relating to the first embodiment is related to whether the door switch is in the ON or OFF state.

With reference to FIGS. 7 and 8, the prescribed interval distance x1 of the door switch 7 will be described. The letter "r" denotes the thickness of the spacer 21. The distance between the initial position PA and the second prescribed position P2 is reduced by the value equal to the thickness r of the spacer 21, or expressed as "d-r." The letter "a" denotes the distance between the initial position PA and the first prescribed position P1. Thus, the prescribed interval distance x1 is expressed as "d-r-a," in other words, the prescribed interval distance x of the existing door switch 5—the thickness r." The prescribed interval distance x1 is shorter than the prescribed interval distance x of the existing door switch 5.

Figure 9:
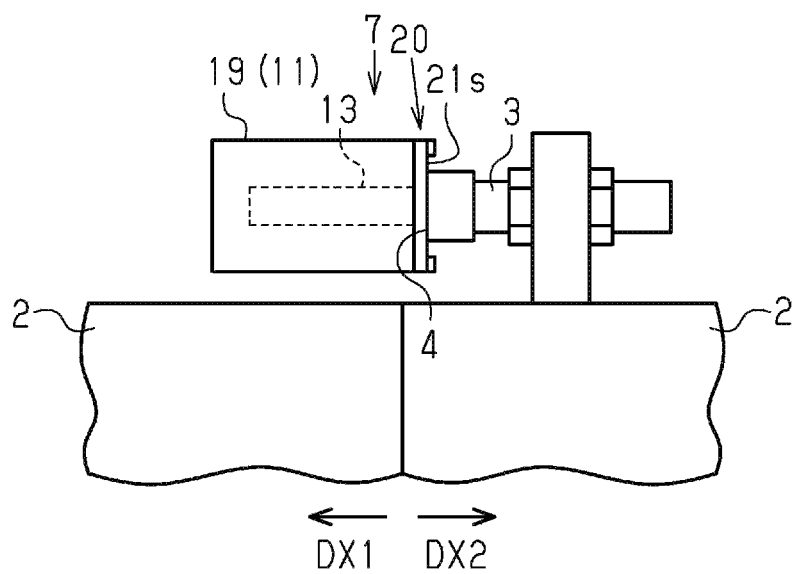
FIG. 9 schematically illustrates what is observed around the door switch relating to the first embodiment when a door is actually fully closed.

With reference to FIG. 9, the following describes how to install the door switch 7. The door switch 7 can be installed in the same manner as the existing door switch 5. As shown in FIG. 9, the full-closure reference surface 21s is positioned in such a manner that, when the door 2 is actually fully closed, the pressing surface 4 of the pressing unit 3 comes into contact with the full-closure reference surface 21s. After the door switch 7 is attached, the position of the pressing unit 3 is adjusted in the following manner. The position of the pressing unit 3 can be adjusted relative to the door 2 so that, when the door 2 is fully closed, the pressing surface 4 of the pressing unit 3 comes into contact with the full-closure reference surface 21s. With this arrangement, the door switch 7 can be installed in the same manner as the existing door switch 5.

Figure 10:
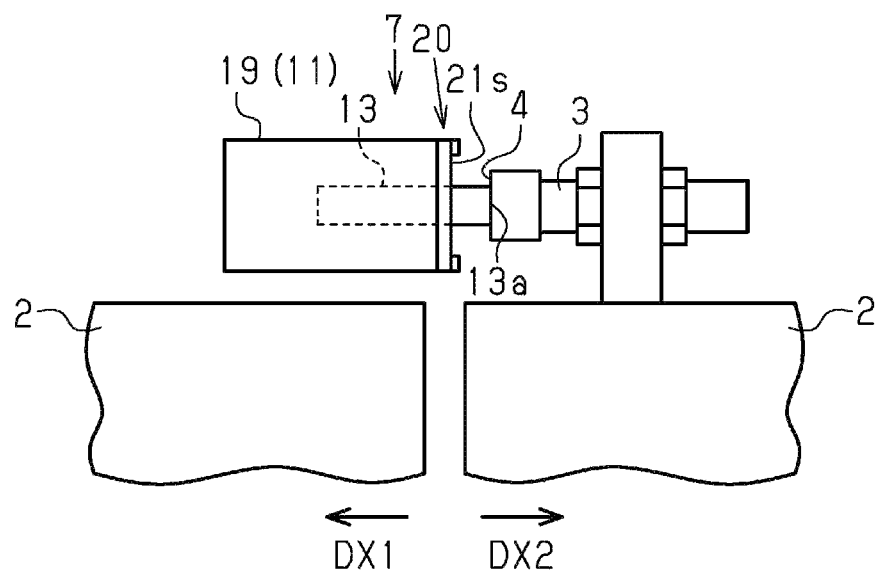
FIG. 10 schematically illustrates what is observed around the door switch relating to the first embodiment immediately before the fully closed state is detected.
Figure 11:
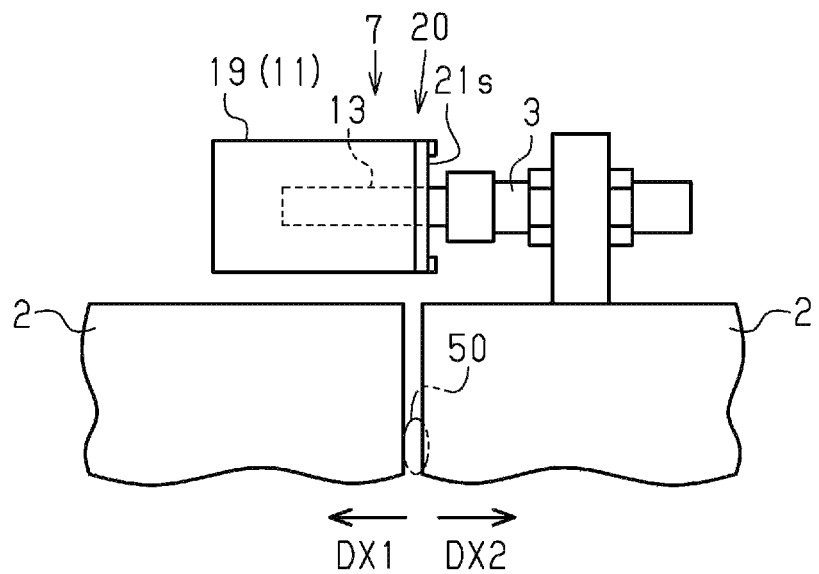
FIG. 11 schematically illustrates what is observed around the door switch relating to the first embodiment when the fully closed state is detected.

With reference to FIGS. 10 and 11, the following describes how the door switch 7 operates as the door 2 is to be closed. As shown in FIG. 10, the door switch 7 is in the OFF state when the pressing surface 4 of the pressing unit 3 of the door 2 comes into contact with the end surface 13a of the rod 13. In other words, the door switch 7 does not detect the full-closure.

As shown in FIG. 11, as the door 2 moves, the rod 13 is pressed in the first direction DX1. When the rod 13 arrives at the first prescribed position P1, the door switch 7 enters the ON state. In other words, the door switch 7 detects the full-closure. As mentioned above, the prescribed interval distance x1 (the distance between the first prescribed position P1 and the second prescribed position P2, which has been changed using the spacer 21) is shorter than the prescribed interval distance x for the existing door switch 5. Accordingly, the door switch 7 does not enter the ON state if the foreign object 50 caught in the door 2 has a thickness larger than double the prescribed interval distance x1. In this case, the door switch 7 does not enter the ON state even when a predetermined period of time has elapsed after an attempt is made to close the door 2. Based on this fact, it can be judged that the foreign object 50 is caught in the door 2. While it is only an object having a predetermined thickness or larger that can be detected in the example case shown in FIG. 4, an object having a small thickness can be detected when caught by adjusting the prescribed interval distance x1 in this example.

The following describes the effects of the door switch 7. The position of the full-closure reference surface 21s can be changed by changing the thickness of the spacer 21 and the position at which the spacer 21 is attached. In this way, the prescribed interval distance x1 can be set and changed with ease. Accordingly, the prescribed interval distance x1 can be changed with ease depending on the vehicle. Furthermore, the door switch 7 is based on the existing door switch 5 and the spacer 21 is the only change that needs to be made. Thus, a plurality of types of door switches 7 can be manufactured in a compatible manner with various types of vehicles and they all may include the existing door switch 5. In other words, the plurality of types of door switches 7 have common parts, which can reduce the complexity in manufacturing and management.

Hereinafter, the advantages of the door switch 7 are described.

(1) The door switch 7 includes the rod 13 configured to move as the door 2 is closed, the detecting unit 15 configured to output a detection signal when one of the ends of the rod 13 has moved by a predetermined distance or more (when the rod 13 has moved and arrived at the first prescribed position P1), and the limiting unit 20 configured to limit the amount of the movement to be made by the rod 13 within the range where the detecting unit 15 can output the detection signal. With this arrangement, the amount of the movement to be made by the rod 13 can be adjusted with ease. In addition, when it is desired to detect an object that may be caught in the door 2, the thickness of the object desired to be detected can be adjusted with ease.

(2) In the door switch 7, the limiting unit 20 is the spacer 21 designed to limit the amount of the movement to be made by the rod 13. The limiting unit 20 is attached to the housing 19 that supports the rod 13 in a movable manner. With this arrangement, the limiting unit 20 can be provided with ease.

(3) After the door switch 7 is attached to the vehicle, the position of the pressing unit 3, which is provided to the door 2 and configured to press the rod 13, is adjusted. With this arrangement, the door switch 7 can be installed in the same manner as the existing door switch 5.

Second Embodiment

Figure 12:
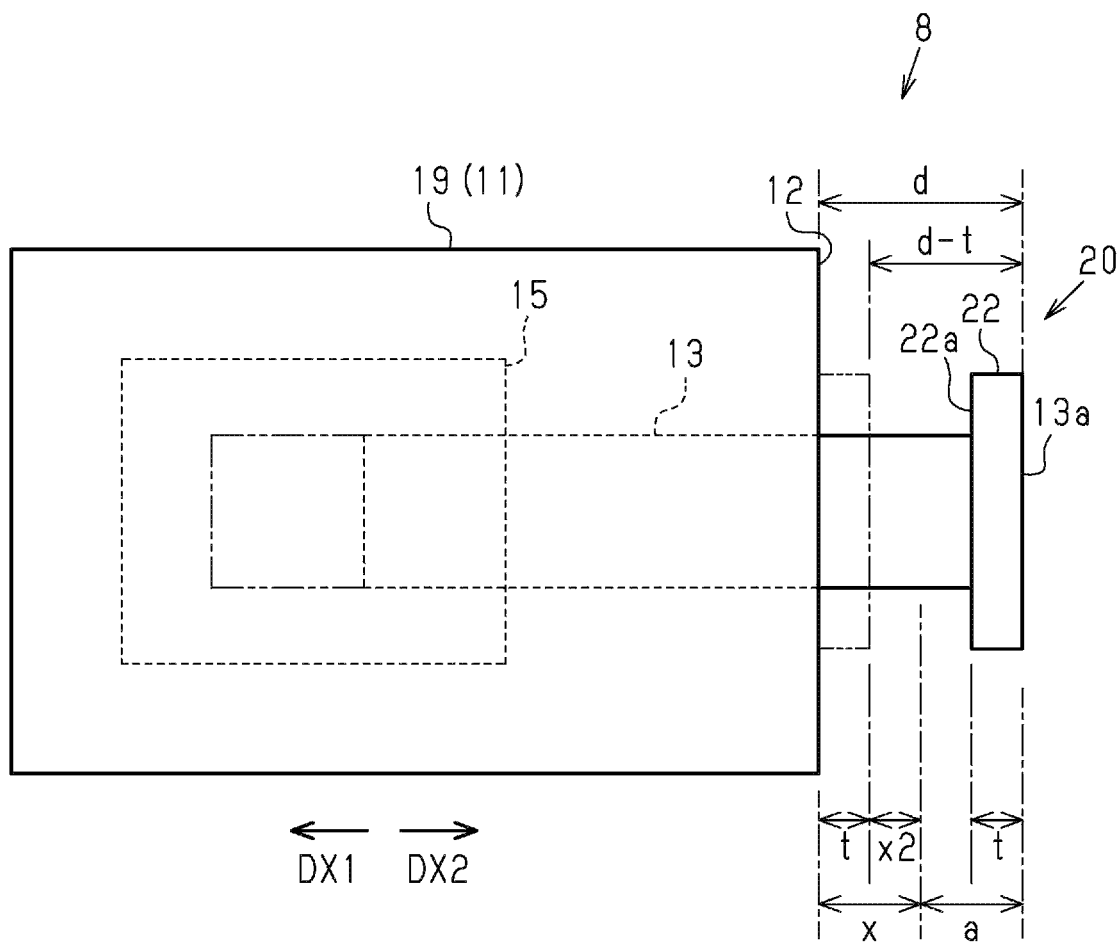
FIG. 12 schematically illustrates a door switch relating to a second embodiment.

With reference to FIG. 12, a door switch 8 relating to a second embodiment of the present invention is described. The door switch 8 relating to the present embodiment is based on the door switch 7 relating to the first embodiment and obtained by modifying the configuration of the rod 13. The door switches 7 and 8 have some common components. In the following description of the door switch 8, those components will be identified by the same reference numerals as used for the door switch 7 relating to the first embodiment.

The limiting unit 20 has the same function as in the first embodiment. To be specific, the limiting unit 20 limits the amount of the movement to be made by the rod 13 within the range where the detecting unit 15 can output the detection signal. In the door switch 7 relating to the first embodiment, the limiting unit 20 is the spacer 21 attached to the housing 19. With this arrangement, the length of the prescribed interval distance x2 can be limited. In the door switch 8 relating to the present embodiment, on the other hand, the limiting unit 20 is a protrusion 22 attached to the rod 13. The protrusion 22 protrudes from the external surface of the rod 13. In the present embodiment, the protrusion 22 is provided on a portion of the rod 13 that is positioned outside the housing 19. The protrusion 22 may be alternately provided on a portion of the rod 13 that is positioned within the housing 19. The protrusion 22 limits the movement of the rod 13 as a result of coming into contact with a portion of the housing 19. In the present embodiment, the protrusion 22 has a contact surface 22a, which is configured to come into contact with the full-closure reference surface 12 of the housing 19. The movement of the rod 13 is limited as a result of the contact surface 22a of the protrusion 22 coming into contact with the full-closure reference surface 12 of the housing 19. With the protrusion 22 being in contact with the housing 19, the length of the prescribed interval distance x2 for the rod 13 can be limited.

The prescribed interval distance x2 will be described in relation to the door switch 8. In the following, the letter "t" denotes the distance from the contact surface 22a of the protrusion 22 to the end surface 13a of the rod 13 in the direction along the direction in which the rod 13 moves. The rod 13 moves from the initial position PA to the position at which the protrusion 22 comes into contact with the full-closure reference surface 12 of the housing 19 (see the two-dot chain line). Therefore, the amount of the movement to be made by the rod 13 can be expressed as "d-t." The letter "a" denotes the distance between the initial position PA and the first prescribed position P1. As a consequence, the prescribed interval distance x2, which is the distance by which the rod 13 travels from the first prescribed position P1 until it stops moving, is expressed as "d-t-a." This distance is equal to "x-t," where x denotes the prescribed interval distance for the existing door switch 5. Thus, the prescribed interval distance x2 is shorter than the prescribed interval distance x of the existing door switch 5.

Figure 13:
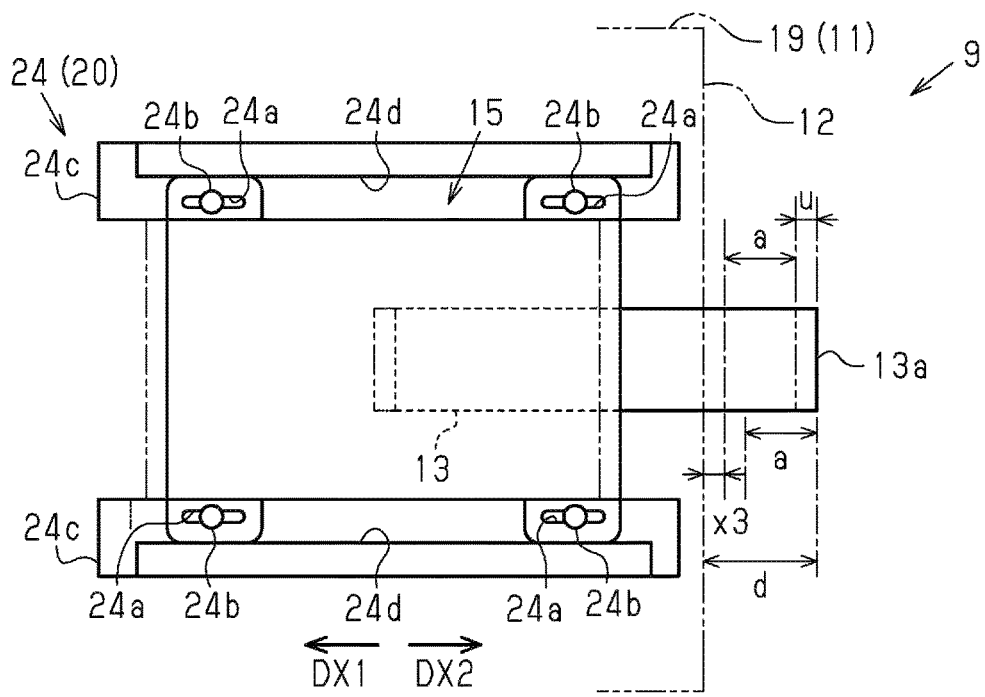
FIG. 13 schematically illustrates what is inside a housing of a door switch relating to a third embodiment.

In the present embodiment, the door switch 8 has the limiting unit 20 and thus provides advantages similar to the advantages described in the section (1) of the first embodiment. In addition, in the door switch 8 described above, the limiting unit 20 is provided on the rod 13 as the protrusion 22 designed to limit the amount of the movement to be made by the rod 13. With this arrangement, the amount of the movement to be made by the rod 13 can be adjusted with ease simply by replacing the rod 13 or adding a part to the rod 13, Third Embodiment With reference to FIG. 13, a door switch 9 relating to a third embodiment of the present invention is described. The door switch 9 relating to the present embodiment is based on the door switch 7 relating to the first embodiment and obtained by modifying the configuration of the detecting unit 15. The door switches 7 and 9 have some common components. In the following description of the door switch 9, those components will be identified by the same reference numerals as used for the door switch 7 relating to the first embodiment.

The present embodiment is the same as the first embodiment in that the limiting unit 20 is configured to limit the amount of the movement to be made by the rod 13 within the range where the detecting unit 15 can output the detection signal, but the limiting unit 20 is structured differently. The limiting unit 20 is configured to change the position of the detecting unit 15 relative to the housing 19. As a result of the change in the position of the detecting unit 15, the position of the rod 13 is also changed. In this way, the distance between the first prescribed position P1 and the second prescribed position P2 is changed.

Specifically speaking, the limiting unit 20 is configured to change the positions of the detecting unit 15 and the rod 13 relative to the housing 19. For example, the limiting unit 20 is provided as a position adjusting unit 24 configured to change the position of the detecting unit 15. The position adjusting unit 24 includes a long hole 24a provided in the detecting unit 15 and extending in the direction in which the rod 13 moves, a bolt 24b that is inserted through the long hole 24a to be fastened onto the housing 19, and a securing portion 24c to secure the detecting unit 15. The securing portion 24c may include a guide 24d configured to guide the detecting unit 15 along the direction in which the rod 13 moves. By changing the position of the detecting unit 15 on the housing 19, the first prescribed position P1 and a prescribed interval distance x3 can be changed.

The prescribed interval distance x3 will be described in relation to the door switch 9. The letter "u" denotes the distance by which the detecting unit 15 moves as a result of the adjustment made to the position of the detecting unit 15. The end surface 13a of the rod 13 is moved from the initial position PA before the adjustment made to the position, closer to the full-closure reference surface 12 by the distance "u." In addition, the first prescribed position P1 is moved from the first prescribed position P1 before the adjustment made to the position, closer to the full-closure reference surface 12 by the distance "u." As a consequence, the prescribed interval distance x3, which is the distance by which the rod 13 travels from the first prescribed position P1 until it stops moving, is expressed as "d-u-a." This is equal to "x-u," where "x" denotes the prescribed interval distance of the existing door switch 5. Thus, the prescribed interval distance x3 is shorter than the prescribed interval distance x of the existing door switch 5. Accordingly, the present embodiment may also provide advantages similar to the advantages described section (1) of the first embodiment.

According to the present embodiment, the door switch 9 has the limiting unit 20 and thus provides advantages similar to the advantages described in the section (1) of the first embodiment. In the door switch 9, the limiting unit 20 is configured to change the position of the detecting unit 15 relative to the housing 19 on which the detecting unit 15 is provided. With this arrangement, the amount of the movement to be made by the rod 13 can be adjusted without the need of changing the contour of the door switch 9.

Fourth Embodiment

Figure 14:
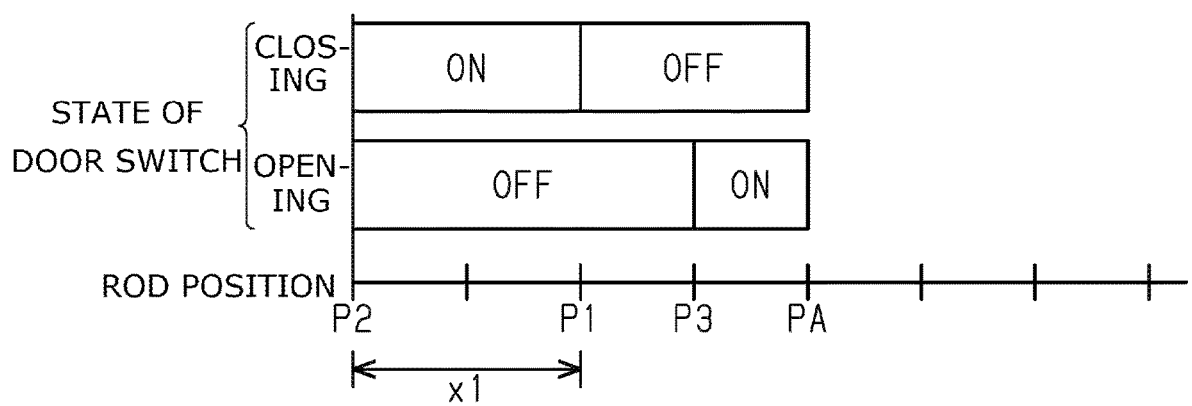
FIG. 14 illustrates how the position of a rod of a door switch relating to a fourth embodiment is related to whether the door switch is in the ON or OFF state.
Figure 15:
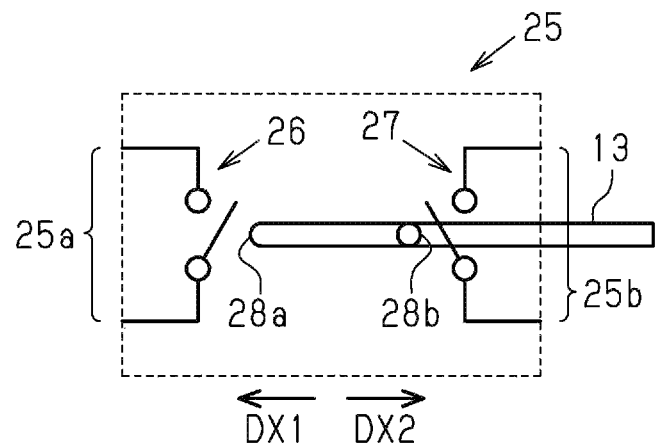
FIG. 15 is a circuit diagram for a detecting unit of the door switch relating to the fourth embodiment.

With reference to FIGS. 14 and 15, a door switch relating to a fourth embodiment of the present invention will be described. The door switch relating to the present embodiment is based on the door switch 7 relating to the first embodiment and obtained by modifying the structure of the detecting unit 15. The door switch relating to the present embodiment have some common components with the door switch 7 relating to the first embodiment. In the following description of the door switch relating to the present embodiment, those components will be identified by the same reference numerals as used for the door switch 7 relating to the first embodiment.

In a case where the prescribed interval distances x1, x2 and x3 are short, the detecting unit 15 may experience chattering since the state of the detecting unit 15 is repeatedly switched if the door 2 is considerably shaken while fully closed. After the door 2 is fully closed, there is no chance that the foreign object 50 gets caught in the door 2. Therefore, after the door 2 is fully closed, it may be preferable that the state of the detecting unit 15 may not be switched between the ON state and the OFF state unless the opening operation is performed to open the door 2. The following describes the detecting unit 15 that has been modified to address this issue.

In the present embodiment, a detecting unit 25 includes two output units (hereinafter, referred to as "the first output unit 25a" and "the second output unit 25b"). The detecting unit 25 is configured to detect the following two states. Firstly, the detecting unit 25 detects that the rod 13 has moved in the first direction DX1 and arrived at the first prescribed position P1 (hereinafter, referred to as "the first detection"). Secondly, the detecting unit 25 detects that the rod 13 has moved in the second direction DX2 and arrived at a third prescribed position P3, which is different from the first prescribed position P1 (hereinafter, referred to as "the second detection"). The third prescribed position P3 is away from the first prescribed position P1 in the second direction DX2. For example, the detecting unit 25 switches the state of the first output unit 25a from the OFF state to the ON state during the first detection. The detecting unit 25 switches the state of the second output unit 25b from the OFF state to the ON state during the second detection.

The following describes an example circuit configuration of the detecting unit 25 with reference to FIG. 15. The detecting unit 25 includes two mechanical switches (hereinafter, referred to as the first switch 26 and the second switch 27). The first switch 26 is away from the second switch 27 in the first direction DX1. The first switch 26 is operated by a first contact portion 28a of the rod 13. The first switch 26 is switched from the OFF state to the ON state based on the fact that the rod 13 has moved in the first direction DX1 and arrived at the first prescribed position P1. In other words, the first switch 26 is in charge of the first detection. The second switch 27 is operated by a second contact portion 28b of the rod 13, which is away from the first contact portion 28a in the second direction DX2. The second switch 27 is switched from the OFF state to the ON state based on the fact that the rod 13 has moved in the second direction DX2 and arrived at the third prescribed position P3. In other words, the second switch 27 is in charge of the second detection. The detecting unit 25 further includes a logic circuit (not shown). The logic circuit generates an ON signal to be output when the first switch 26 is in the ON state and the second switch 27 is in the OFF state, and generates an OFF signal to be output when the first switch 26 is in the OFF state and the second switch 27 is in the ON state. The logic circuit maintains the immediately preceding signal state when the first switch 26 and the second switch 27 are both in the OFF state. With this arrangement, while the rod 13 is positioned between the first prescribed position P1 and the third prescribed position P3, the detecting unit 25 remains in the immediately preceding ON/OFF state. Therefore, while the detecting unit 25 is in the ON state, the state of the detecting unit 25 is not switched directly from the ON state to the OFF state until the rod 13 moves back to the third prescribed position P3 even if the rod 13 is shaken around the first prescribed position P1. This can reduce the chattering. Here, "chattering" means a phenomenon in which the output signal output from the detecting unit 25 is repeatedly switched within a short period of time between the ON signal and the OFF signal.

The following describes the advantages of the door switch. The door switch includes the following detecting unit 25. The detecting unit 25 is configured to detect the position of the rod 13. Specifically speaking, the detecting unit 25 firstly detects that the rod 13 has arrived at the first prescribed position P1 and secondly detects that the rod 13 has moved in the second direction DX2 and arrived at the third prescribed position P3. With this arrangement, the first prescribed position P1, which is the target to be detected by the detecting unit 25 when the rod 13 is moving in the first direction DX1, and the third prescribed position P3, which is the target to be detected by the detecting unit 25 when the rod 13 is moving in the opposite direction to the first direction DX1, are positioned differently. This can reduce the chattering that may occur during the detection of the position of the rod 13.

Fifth Embodiment

Figure 16:
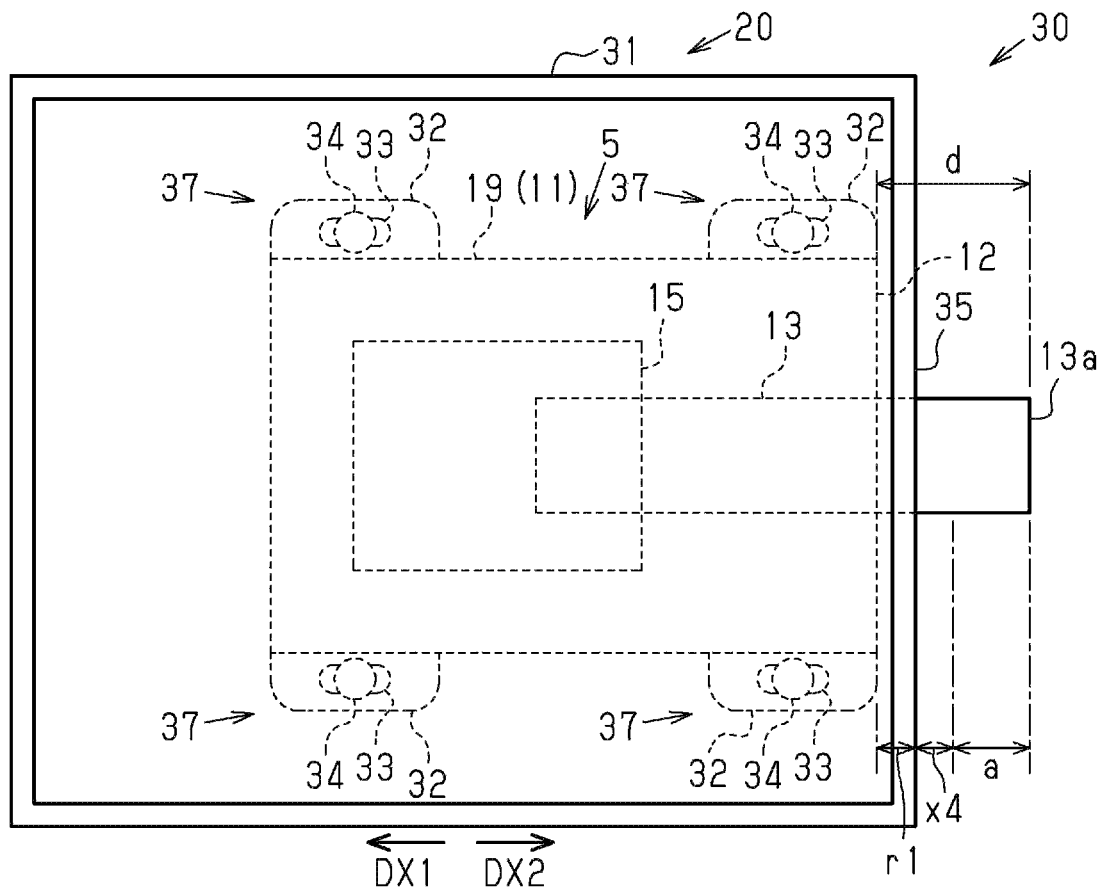
FIG. 16 schematically illustrates a door switch relating to a fifth embodiment.

With reference to FIG. 16, a door switch 30 relating to a fifth embodiment of the present invention is described. The door switch 30 relating to the present embodiment is based on the door switch 7 relating to the first embodiment and obtained by modifying the configuration to change the position of the full-closure reference surface 12.

The door switch 30 is based on the existing door switch 5. The door switches 5 and 30 have some common components. In the following description of the door switch 30, those components are identified by the same reference numerals as used for the existing door switch 5.

The door switch 30 relating to the present embodiment includes the components of the existing door switch 5 and a base 31. In the present embodiment, the limiting unit 20 limits the amount of the movement to be made by the rod 13 within the range where the detecting unit 15 can output the detection signal, as in the first embodiment. The limiting unit 20 can change the position of the full-closure reference surface 35 as the housing 11 of the existing door switch 5 is provided on the base 31 in such a manner that the position of the housing 11 can be adjusted. The limiting unit 20 includes the base 31 and a position adjusting attachment structure 37 that attaches the existing door switch 5 to the base 31 in such a manner that the position of the door switch 5 can be adjusted. The base 31 is, for example, a case covering the housing 19 (11). The base 31 has the full-closure reference surface 35 at the end thereof in the second direction DX2.

The housing 19 is attached to the base 31 such that the position of the housing 19 can be adjusted. The end surface of the housing 19 in the second direction DX2 (the full-closure reference surface 12) is positioned away from the full-closure reference surface 35 of the base 31 in the first direction DX1.

The housing 19 has four attaching portions 32. The attaching portions 32 each have a fastening hole 33 extending in the direction in which the rod 13 moves. A fastening member 34 such as a screw is inserted through the fastening hole 33. The fastening member 34 is arranged at a desired position along the fastening hole 33. With this arrangement, the position of the housing 19 can be adjusted along the direction in which the rod 13 moves. The above-described position adjusting attachment structure 37 includes the four attaching portions 32 and the fastening members 34.

With reference to FIG. 16, a prescribed interval distance x4 will be described in relation to the door switch 30. The letter "r1" denotes the distance between the full-closure reference surface 12 of the housing 19 and the full-closure reference surface 35 of the base 31. The distance between the initial position PA and the second prescribed position P2 is shorter by the above-mentioned distance r1 and can be expressed as "d-r1." The letter "a" denotes the distance between the initial position PA and the first prescribed position P1. Thus, the prescribed interval distance x4 is expressed as "d-r1-a," in other words, the prescribed interval distance x of the existing door switch 5—the distance r1." As described above, the prescribed interval distance x4 is shorter than the prescribed interval distance x of the existing door switch 5.

According to the above-described door switch 30, the prescribed interval distance x4 can be adjusted by adjusting the positional relation between the full-closure reference surface 12 of the housing 19 and the full-closure reference surface 35 of the base 31. The other components than the base 31 can be the components of the existing door switch 5.

Hereinafter, the advantages of the door switch 30 are described.

(1) The door switch 30 has the limiting unit 20. The limiting unit 20 at least includes the base 31 having the full-closure reference surface 35. The housing 19 is attached to the base 31 such that the position of the housing 19 can be adjusted. With this arrangement, the position of the full-closure reference surface 35 can be changed by adjusting the position of the housing 19 relative to the base 31. In this way, the prescribed interval distance x4 can be adjusted.

(2) The housing 19 has the fastening holes 33 extending in the direction along the closing direction DC. Instead of this arrangement, similar fastening holes 33 may be provided in the base 31, or in the housing 11 and the base 31.

With this arrangement, when the base 31 and the housing 19 are fastened together with the screws inserted through the fastening holes 33, the position at which the housing 19 is attached to the base 31 can be adjusted with ease. As described above, only a simple structure is employed to adjust the position of the housing 19.

(3) In the above-described door switch 30, the other components than the base 31 may be the components of the existing door switch 5. For example, the door switch 30 can be obtained by attaching the base 31 to the existing door switch 5. In this case, improved productivity can be achieved since a plurality of types of door switches 30 can have common parts.

Sixth Embodiment

Figure 17:
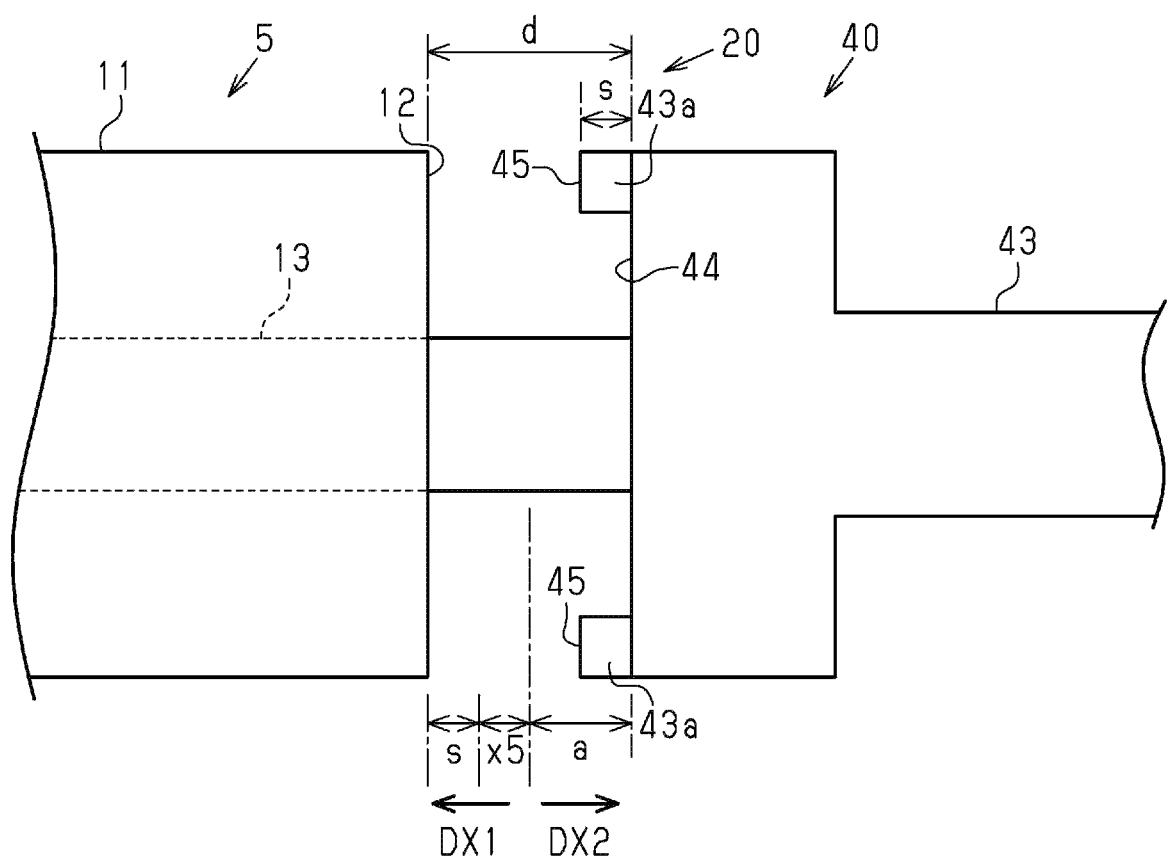
FIG. 17 schematically illustrates a portion of a door switch relating to a sixth embodiment.

With reference to FIG. 17, a door switch 40 relating to a sixth embodiment of the present invention is described. The door switch 40 is based on the existing door switch 5. Further, the door switch 40 includes a pressing unit 43 to be attached to the door 2. The pressing unit 43 has a different structure than the pressing unit 3 described in the first to fifth embodiments. The door switches 5 and 40 have some common components. In the following description, those components will be identified by the same reference numerals as used for the existing door switch 5.

The limiting unit 20 of the door switch 40 limits the amount of the movement to be made by the rod 13 within the range where the detecting unit 15 can output the detection signal, as in the first embodiment. The limiting unit 20 is configured to change the position of an abutting surface 45 of the pressing unit 43. For example, the limiting unit 20 is a step portion 43a provided in the pressing unit 43. The pressing unit 43 will be hereinafter described.

The pressing unit 43 has a pressing surface 44 for pressing the end surface 13a of the rod 13 and the abutting surface 45 that abuts the full-closure reference surface 12 of the housing 11. For example, the pressing surface 44 is the surface of the pressing unit 43 that faces in the first direction DX1. The step portion 43a is provided at the edge of the pressing surface 44. The step portion 43a protrudes in the first direction DX1 from the edge of the pressing surface 44. The surface of the step portion 43a that faces in the first direction DX1 is the abutting surface 45.

The position of the abutting surface 45 can be changed relative to the pressing surface 44. The position of the abutting surface 45 can be changed relative to the pressing surface 44 by replacing the pressing unit 43 with a different part. In other words, the pressing unit 43 is replaceable. A plurality of types of pressing units 43 differing from each other in height of the step portion 43a (the length in the first direction DX1) may be prepared in advance.

With reference to FIG. 17, a prescribed interval distance x5 will be described in relation to the door switch 40. The letter "s" denotes the height of the step portion 43a (the height in the first direction DX1). As the door 2 moves in the first direction DX1, the rod 13 is pressed by the pressing unit 43. The rod 13 stops moving when the abutting surface 45 of the pressing unit 43 abuts the full-closure reference surface 12 of the housing 11. Therefore, the distance between the initial position PA and the second prescribed position P2 is expressed as "d-s." The letter "a" denotes the distance between the initial position PA and the first prescribed position P1. Thus, the prescribed interval distance x5 is expressed as "d-s-a," in other words, "x-s," where x denotes the prescribed interval distance of the existing door switch 5. As described above, the prescribed interval distance x5 is shorter than the prescribed interval distance x of the existing door switch 5.

According to the above-described door switch 40, the prescribed interval distance x5 can be adjusted by adjusting the positional relation between the pressing surface 44 of the pressing unit 43 and the abutting surface 45. In addition, the other components than the pressing unit 43 can be the components of the existing door switch 5.

The advantages of the door switch 40 are described.

(1) The above-described door switch 40 further includes the pressing unit 43 to be provided on the door 2. The pressing unit 43 includes the pressing surface 44 for pressing the rod 13 and the abutting surface 45 that may abut the full-closure reference surface 12. In the pressing unit 43, the position of the abutting surface 45 can be changed relative to the pressing surface 44.

With this arrangement, the second prescribed position P2 of the rod 13 can be changed by changing the position of the abutting surface 45 relative to the pressing surface 44. It is only the pressing unit 43 that needs to be changed in order to change the prescribed interval distance x5. Therefore, the change can be made with ease.

(2) In the pressing unit 43, the portion including the abutting surface 45 may be configured such that its position can be changed relative to the portion including the pressing surface 44. In this way, while the pressing unit 43 is attached to the door 2, the position of the abutting surface 45 can be changed relative to the pressing surface 44. With this arrangement, when the prescribed interval distance x5 needs to be adjusted after the door switch 40 has been installed, the pressing unit 43 does not need to be removed. Therefore, the prescribed interval distance x5 can be adjusted within a shortened period of time.

<Variations>

The door switches 7, 8, 9, 30 and 40 are not limited to the examples shown in the above-described embodiments. For example, the door switches 7, 8, 9, 30 and 40 relating to the embodiments may be modified in the following manner.

The features of the limiting unit 20 relating to the first embodiment, the features of the limiting unit 20 of the second embodiment, the features of the limiting unit 20 relating to the third embodiment, the features of the limiting unit 20 relating to the fifth embodiment and the features of the limiting unit 20 relating to the sixth embodiment may be combined with each other.

The prescribed interval distances x1, x2, x3, x4 and x5 (the distance between the first prescribed position P1 and the second prescribed position P2) in the embodiments may be alternately configured to be shorter than the prescribed interval distance x for the existing door switch 5.

With this arrangement, the prescribed interval distances x1, x2, x3, x4 and x5 are shorter than the prescribed interval distance x. By using the door switches 7, 8, 9, 30 and 40 having the thus modified prescribed interval distance, a foreign object 50 have a smaller thickness can be detected when compared with the case where the existing door switch 5 having the prescribed interval distance x is used. In the above-described manner, the condition to allow the vehicle to depart is not satisfied even if the foreign object 50 has a small thickness. Therefore, the railway vehicle can be prevented from departing with a thin foreign object 50 being caught.

In the embodiments, the door switches 7, 8, 9, 30 and 40 may be provided on the door 2. If this is the case, the pressing unit 3 is arranged on the vehicle body 1 at such a position that, when the door 2 is fully closed, the pressing unit 3 comes into contact with the rod 13 of the door switches 7, 8, 9, 30 and 40.

What is claimed is:

1. A vehicle door switch comprising:
   a rod configured to move as a door is closed;
   a detecting unit configured to output a detection signal when one of ends of the rod has moved by a predetermined distance or more; and
   a limiting unit configured to limit an amount of movement made by the rod and corresponding to a range where the detecting unit outputs the detection signal to a limited value that is shorter than a prescribed initial value.

2. The vehicle door switch according to claim 1, wherein the limiting unit is configured as a spacer for limiting the amount of the movement to be made by the rod and attached to a housing that supports the rod in a movable manner.

3. The vehicle door switch according to claim 1, wherein the limiting unit is provided on the rod as a protrusion for limiting the amount of the movement to be made by the rod.

4. The vehicle door switch according to claim 1, wherein the limiting unit changes a position at which the detecting unit is positioned, relative to a housing on which the detecting unit is provided.

5. A method for attaching a vehicle door switch, comprising:
   attaching a vehicle door switch to a vehicle, the vehicle door switch including a rod configured to move as a door is closed, a detecting unit configured to output a detection signal when one of ends of the rod has moved by a predetermined distance or more, and a limiting unit configured to limit an amount of movement made by the rod and corresponding to a range where the detecting unit outputs the detection signal, to a limited value that is shorter than a prescribed initial value; and
   adjusting a position of a pressing unit provided on the door, the pressing unit being configured to press the rod.

* * * * *